Sept. 22, 1953   S. V. WILLIAMS   2,652,943
HIGH-PRESSURE CONTAINER HAVING LAMINATED WALLS
Filed Jan. 9, 1947   2 Sheets-Sheet 1
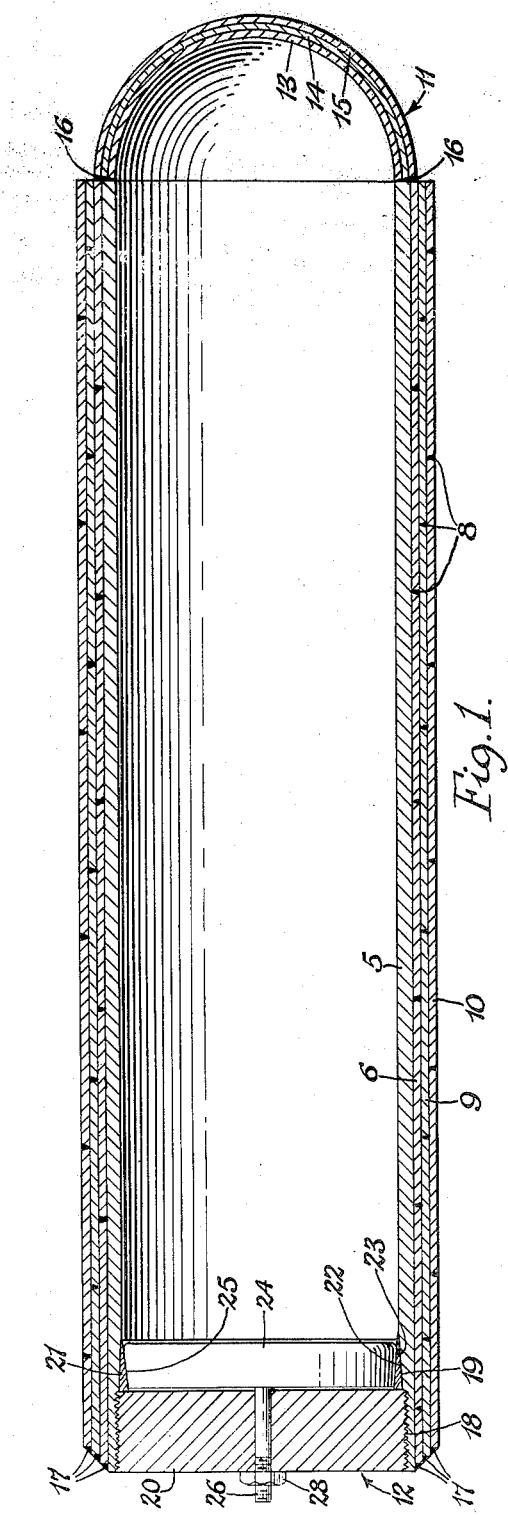
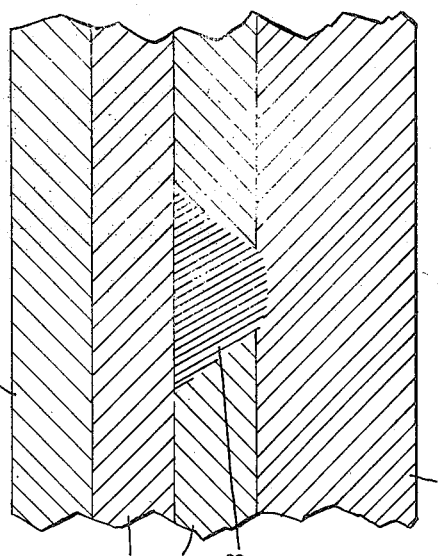
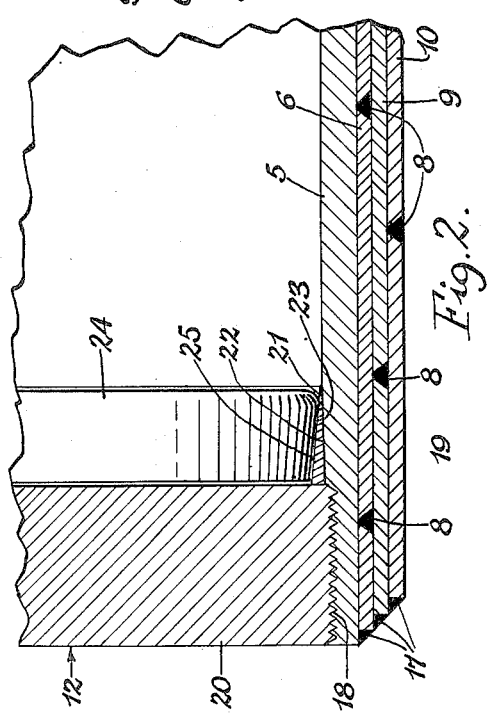
INVENTOR.
Sylvester V. Williams
BY Popp and Popp
attorneys.

Sept. 22, 1953 S. V. WILLIAMS 2,652,943
HIGH-PRESSURE CONTAINER HAVING LAMINATED WALLS
Filed Jan. 9, 1947 2 Sheets-Sheet 2
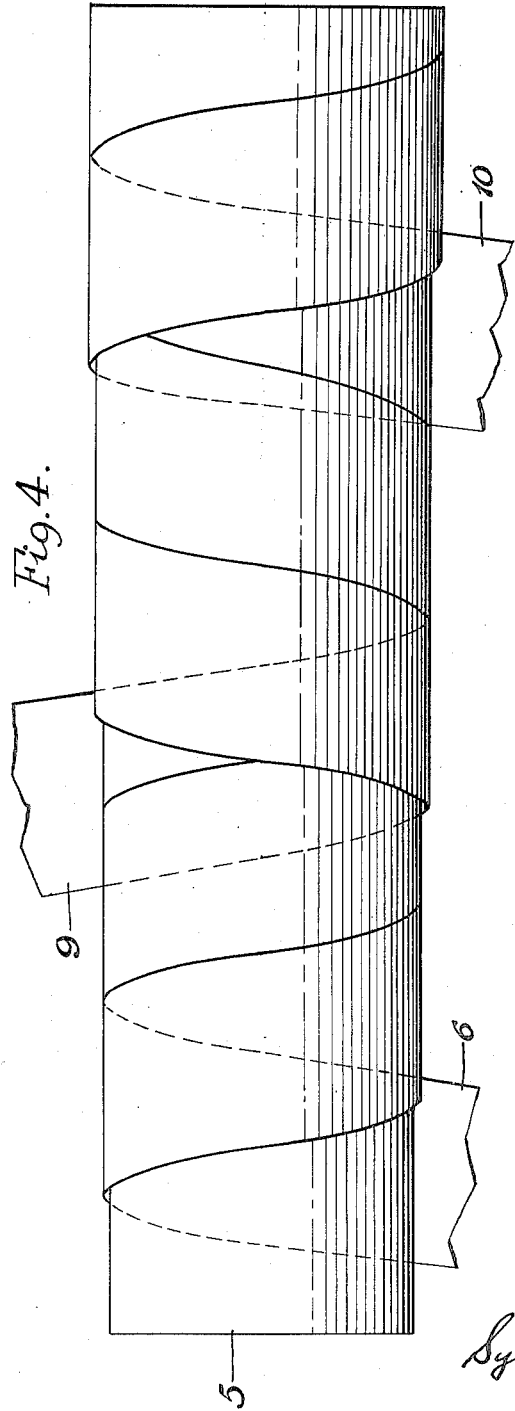
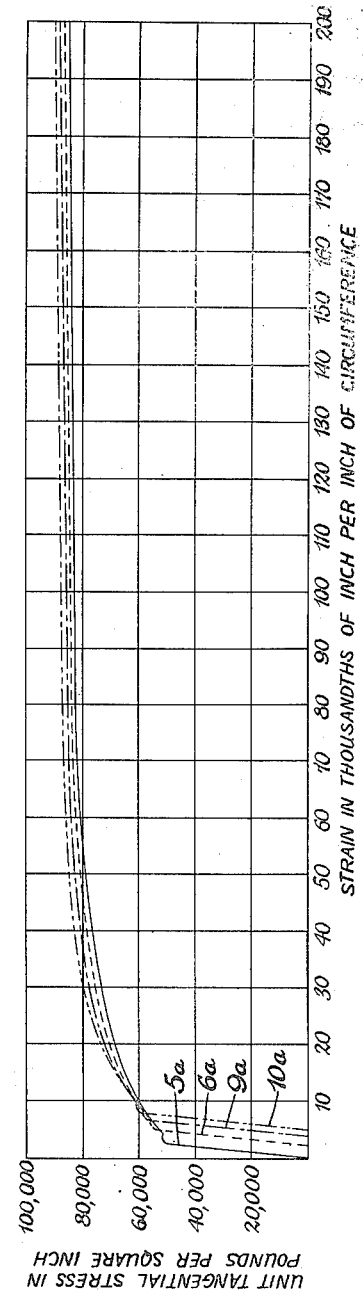
INVENTOR.
Sylvester V. Williams
BY Popp and Popp
Attorneys.

Patented Sept. 22, 1953

2,652,943

UNITED STATES PATENT OFFICE 2,652,943

HIGH-PRESSURE CONTAINER HAVING LAMINATED WALLS

Sylvester Vet Williams, Titusville, Pa.

Application January 9, 1947, Serial No. 721,034

3 Claims. (Cl. 220—3)

This invention relates to built up high pressure vessels or containers and the like and which can also be adapted for high or low temperatures. By "high pressure" as used in connection with such vessels or containers is meant pressures of such magnitude, on test or in use, as to stress the inner portions or inner cross-section of the wall of the vessel or container to values which approach or exceed the yield point or elastic limit thereof.

One of the principal objects of the present invention is to provide such a built up high pressure vessel or container in which the innermost or core member is reinforced by succeeding surrounding reinforcing stratum members which provide a progressively increasing amount of resistance to internal pressure without the harmful concentration of stresses in any of these members.

Another important object of the present invention is to provide such a built up high pressure vessel or container in which the metals forming the component core and reinforcing members are so selected in relation to one another on the basis of their individual stress-strain characteristics that in use the resultant stress-strain relation throughout the built up wall is such that the stresses in any member of the wall, and particularly the innermost or core member of the wall, are prevented from greatly exceeding the yield points or elastic limits of the selected metals.

Another important object of the present invention is to provide such a built up high pressure vessel or container in which the metals forming the component core and reinforcing members are so selected in relation to one another on the basis of their individual stress-strain characteristics that the resultant stress-strain relation throughout the built up wall is such that no one member or group of members is stressed to a value approaching its point of failure, all of the members approaching this point together.

Another object of the invention is to provide such built up high pressure vessels or containers which can be made of large size to provide the volume necessary for the storing up or accumulation of large quantities of energy.

Another object of the invention is to provide such built up high pressure vessels or containers which can be made of small size for special applications such as for use as experimental and pilot stages.

Another object is to provide such a built up high pressure vessel or container, the stress-strain properties of which can be accurately predicted and controlled and in particular can be accurately determined by actual test of the material used in fabricating the inner core member and reinforcing members of the wall.

Another object is to provide such a built up high pressure vessel or container which permits the utilization of the full inherent physical properties of the metal.

Another object is to provide such a built up high pressure vessel or container in which a more accurately known factor of safety can be established.

Another object is to provide such a built up high pressure vessel or container which can be made of minimum wall thickness to withstand the particular pressure for which it is designed.

Another object is to provide such a built up high pressure vessel or container which is low in cost and in particular is adapted to the variations in composition, tolerances, form and finish which must be accepted in commercial materials.

Another object is to provide such a built up high pressure vessel or container in which alloyed metals can be used most advantageously, particularly in the use of corrosion-resistant materials as the inside or outside members.

Another object of the invention is to achieve the above objectives in a built up high pressure vessel or container in which at least the reinforcing members are in the form of helically wound sheet metal strips welded at their mating edges, such helically wound welded structure eliminating longitudinal and girth welds; eliminating the undesirable effect of the crowning inherent in plates; taking advantage of the mechanical refinement of the metal brought about by the hot working and cold working of strip sheet metal; achieving the advantages of fusion welding without being penalized by the lower degree of efficiency often assigned welded members or joints; and permitting of more accurate design of the vessel or container.

Other objects and advantages will appear from the following description and accompanying drawings in which:

Fig. 1 is a central longitudinal sectional view of a built up high pressure vessel embodying the present invention.

Fig. 2 is an enlarged fragmentary view similar to Fig. 1 and showing the details of the closure for one end of the vessel.

Fig. 3 is a similar fragmentary view on a greatly enlarged scale and showing one way in which the joints between the convolutions of the reinforcing strips may be welded.

Fig. 4 is a side elevational view of a partially built up high pressure vessel embodying the present invention and showing the manner in which the same is fabricated.

Fig. 5 is a graph showing the stress-strain properties of each of the members of the built up high pressure vessel shown in Figs. 1-3 and showing tangential stress plotted against circumferential strain to show the manner in which these stress-strain properties are interrelated to achieve the advantages of the present invention.

The built up high pressure vessel is shown as being of cylindrical form and its innermost core member 5 is shown as being in the form of a solid tube although it will be understood that this innermost core member could be in the form of a helically wound sheet metal strip with the edges of its convolutions welded together in the same manner as with the reinforcing members as hereinafter described or in any other suitable manner.

Upon this inner core member or cylinder 5 is helically wound a continuous strip of sheet metal with the mating edges of its convolutions in closely spaced relation to each other to form a reinforcing member or stratum 6 for the innermost core member or cylnder 5. This reinforcing member or strip 6 is freely wrapped upon the innermost core member or cylinder 5 to provide metal to metal contact therewith. However, with commercial materials having surface irregularities it is necessary to recognize an actual clearance between the innermost or core member 5 and the reinforcing member or stratum 6, this clearance generally not exceeding 0.0045 inch.

The edges of the convolutions of this reinforcing member or stratum 6 are preferably welded to each other and to the surface of the innermost core member or cylinder 5 and for this purpose the opposite edges of the helically wound reinforcing member or stratum may be beveled and the weld metal, represented by the numeral 8, applied in the groove formed by the mating edges of the convolutions of the reinforcing member 6 and also to the opposite edge of this reinforcing member if desired. Thus, the metal deposited by the welding rod can be continuously applied to the beveled edges of adjacent convolutions of the strip being brought against the inner core member or cylinder 5 and simultaneously against the adjacent outer surface of the innermost core member or cylinder 5 to provide a continuous helical weld having the cross sectional form illustrated in Fig. 3. This welding preferably proceeds with the winding of the reinforcing strip 6 upon the innermost core member or cylinder 5. While welding with a welding rod is preferred, it will be understood that any type of welding such as resistance or spot welding can be employed.

If it is desired to place the innermost core member or cylinder 5 under an initial compression, the strip forming the reinforcing member or stratum 6 can be wound under sufficient tension to effect the desired compression of the innermost core member or cylinder 5, or the inner cylinder can be placed under initial compression by autofrettage or other methods.

After the reinforcing member or stratum 6 has been so helically wound upon and welded to the innermost core member or cylinder 5, a second strip of sheet metal is helically wound over the first reinforcing member or stratum 6 to form a second reinforcing member or stratum 9. The strip forming this second reinforcing member or stratum 9 is preferably applied and welded in the same manner as the first reinforcing member or stratum 6, the strip being helically wound with the edges of its convolutions in closely spaced relation and being wound in metal to metal contact. However, as with the reinforcing member or stratum 6, a radial clearance, due to the variations in tolerances, form and finish which must be accepted in commercial materials, must be recognized, this clearance generally not exceeding 0.0045 inch. The edges of the convolutions of this second reinforcing member or stratum 9 are preferably welded to each other and to the surface of the first reinforcing member or stratum 6 in the same manner as with the convolutions of the first reinforcing member or stratum 6, and the same reference numeral 8 has therefore been applied to the continuous helical weld of the second reinforcing member or stratum 9. While the second reinforcing member or stratum 9 can be wound parallel with the first reinforcing member or stratum 6, it is shown as wound in the reverse direction.

After the second reinforcing member or stratum 9 has been so helically wound upon and welded to the first reinforcing member or stratum 6, a third strip of sheet metal is helically wound over the second reinforcing member or stratum 9 to form a third reinforcing member or stratum 10. The strip forming this third reinforcing member or stratum 10 is preferably applied and welded in the same manner as the first reinforcing member or stratum 6, this strip being helically wound with the edges of its convolutions in closely spaced relation and in metal to metal contact, a clearance of generally not exceeding 0.0045 inch due to commercial manufacturing deviations being recognized. The edges of the convolutions of this third reinforcing member or stratum 10 are preferably welded to each other and to the surface of the second reinforcing member or stratum 9 in the same manner as with the convolutions of the first reinforcing member or stratum 6 and the same reference numeral 8 has therefore been applied to the continuous helical weld of the third reinforcing member or stratum 10. The convolutions of the third reinforcing member 10 are shown as parallel with but in axially offset relation to the convolutions of the first reinforcing member or stratum 6.

The ends of the tubular shell constructed as above described can be closed in any suitable manner, an end head 11 being shown as provided at one end of the shell and a removable end head 12 being provided at the opposite end of the shell. These end heads can be of any form and secured in any manner but as illustrated in the drawings are shown as constructed as follows: The end head 11 is shown as being of hemispherical form and composed of a series of hemispherical sheet metal stratum members 13, 14 and 15 which are nested together. The rim of this composite end head is squared off and welded to one end of the tubular sheet metal built up shell, as indicated at 16, this end likewise being squared off. It will be noted that the thickness of the end head 11 is only half the thickness of the tubular shell, this being due to the fact that the longitudinal stress on a tubular vessel is one-half the hoop or girth stress thereof.

At its opposite end the successive strata 6, 9 and 10 of the tubular built up shell are preferably stepped back and the stepped edges welded to each other as illustrated at 17. At this end the innermost core member or cylinder 5 is preferably internally threaded as indicated at 18, and beyond these threads is tapered to provide a slightly outwardly facing conical taper 19. An externally threaded circular end head 20 of any suitable form is screwed into the threads 18.

To provide a pressure seal at this end of the vessel, a gasket or sealing ring 21 is placed within the vessel adjacent the end head 20, this ring having an external conical bevel 22 fitting the conical bevel 19 of the innermost core member or cylinder 5 and also having an internal conical bevel 23 which decreases toward the end head 20 so that the gasket or sealing ring 21 is of wedge shape in radial cross section. Within the vessel is arranged a circular follower 24, the rim of which is beveled as indicated at 25, to fit the bevel 23 of the ring 21. This follower can be forced toward the end head 20 by means of a stem 26 which projects through the end head 20 and which has a threaded end provided with a nut 28 for this purpose.

It will be seen that with this construction the follower 24 can be placed within the vessel, following which the bevel gasket or sealing ring 21 can be inserted with its bevel 22 in engagement with the bevel 19 of the innermost core member or cylinder 5 and that thereafter the follower 24 can be moved axially outwardly so that its bevel 25 engages the bevel 23 of this ring. Following this, the end head 20 can be screwed into the threads 18 of the innermost core member or cylinder 5, the stem 26 being brought through this end head. Thereafter, the nut 28 can be applied and tightened so as to draw the follower 24 axially outward, this movement causing the bevel 25 of this follower to expand the bevel gasket or sealing ring 21 and provide sealed contact between both of its bevels 23 and 22 and the bevels 25 and 19 of the follower and innermost core member or cylinder 5. It will further be seen that the pressure within the vessel is exerted against the follower 24 to urge it axially outwardly and thereby provide greater compression between the bevels 25, 23, 22 and 19. An increased pressure within the vessel thereby serves to more firmly seal the end head 12.

An important feature of the invention resides in the selection of properties of the several body members or strata 5, 6, 9 and 10 of the built up body, particularly as to the yield point, modulus of elasticity and ultimate strength thereof to provide a progressively increasing amount of resistance to internal pressure and so that each body member or stratum is prevented from greatly exceeding its yield point in use and so that all members would approach the point of failing together. An example of this selection of the properties of the several strata 5, 6, 9 and 10 is illustrated in the graph, Fig. 5, in which the stress of each stratum member is plotted against the strain thereof.

In the graph illustrated in Fig. 5 the tangential unit stress is plotted against the circumferential unit strain for each member in the built up vessel shown in Figs. 1–4. In this graph the stress-strain characteristics of the innermost core member or cylinder 5 are represented by the line 5a and the stress-strain characteristics of the reinforcing members 6, 9 and 10 are represented by the lines 6a, 9a and 10a, respectively. From this graph it will be noted that the yield point of the innermost core member or cylinder 5 is the lowest of all the members making up the composite shell and also that the yield points of the reinforcing members 6, 9 and 10 are relatively and progressively higher in the order named. In other words, the yield points of the several members progressively increase in value from the innermost member 5 to the outermost member 10. This relationship is achieved by the selection of the metals of which each member is made, based on the stress-strain characteristics of these metals. Also, it will be noted that the non-elastic deformation or plastic portions of the stress-strain curves for the several members is such that all members have approximately the same ultimate strength and approach their point of failure together.

The radial spacing between adjacent members due to commercial deviations is accounted for in the graph shown in Fig. 5 by beginning the curve 6a at a point where the innermost core member 5 is already under stress and is strained by the application of internal pressure in the vessel. The strain or circumferential enlargement of the innermost core member 5 takes up the radial clearance that existed between the core member 5 and the first reinforcing member 6 and thereby transmits and distributes the load to the first reinforcing member 6. In the same manner the radial clearance between the first and second reinforcing members 6 and 9 is taken up by the strain or circumferential enlargement of the first reinforcing member 6, caused by the building up of the internal load in the vessel. Similarly, as this internal load continues to increase, the radial clearance between the second and third reinforcing members 9 and 10 is taken up by the strain or circumferential enlargement of the second reinforcing member 9.

It will thus be seen that upon the first application of high internal fluid pressures to the vessel wall, as in the initial testing thereof, the innermost core member 5 is strained to a certain point where the first reinforcing member 6 is operatively engaged thereby and then as both members 5 and 6 are subjected to further strain the second reinforcing member 9 is operatively engaged and these members when strained still further will be assisted by the third reinforcing member 10.

This initial straining of the vessel wall whereby the inner core is expanded into stress transmitting relation with each successive reinforcing strata and the clearances referred to above are substantially eliminated, results in a permanent stretching of the core member and the adjacent innermost layers and a raising of the yield point of the metal thereof so that in service the clearance between the strata is no longer a factor in stress transmission and the several strata reach their yield points during stressing more nearly at the same time whereby efficient working of the metal is obtained throughout the thickness of the wall.

Furthermore, the resulting increase in the elastic limit for the metal of the core, and proportionately for the metal of the adjacent successive layers, provides a more nearly uniform breathing of the vessel in service.

Since the outer strata are of larger diameter than the core and inner strata, and have more inches of circumference over which the strain from a given stress is distributed; there will be less circumferential stretch per inch of circumference in the outer layers than in the inner layers, reflecting a natural reduction in stress from the inner to the outer layers. The present invention does not materially compensate for this difference in stress and strain, but does prevent added differentials in stress caused by improper characteristics of the metal which would interfere with the transmission of stress from the core and inner layers to the outer layers.

Since there is less stretch (strain) per inch of circumference for the outer layers, the stress-strain relationship as shown by diagrams used in evaluating the properties of each layer of metal, provides a means for selecting material for the outer layers that does not require as much strain to pick up its share of the load (stress) as is required for the material of the inner layers. In other words, the ability of the metal of the outer layers to deform before failure should not be as great as that for the metal of the inner layers.

In this way the invention compensates for the fact that strain is greatest on the inside, and tangential stress is greatest on the outside in a thick wall vessel having the load or pressure correctly distributed throughout the entire thickness or section. It is possible with the present invention to produce a vessel in which any failure will first occur in the outside layer, whereas it has been a characteristic of layer vessels heretofore that failure first occurs in the inner layer which latter has indicated that the outer layers had not reached their maximum useful stress at the time of initial failure of the inner layer.

The present invention is applicable principally to those ultra high pressure vessels of spherical or cylindrical shape where it is necessary from a design standpoint to lower the traditionally accepted factor of safety of 4 to 5 down to 2 or 2½, and to consider that the vessel is working near to or above the original elastic limit of the metal of the core. In such vessels it is not as important to eliminate clearances between the strata and to obtain immediate stress transference from the core and inner strata to the outer strata.

Since the innermost core member or cylinder 5 is subjected to the greatest unit strain in use, it will be noted from the stress-strain characteristics of this member, as represented by the line 5a, that it must withstand the greatest unit strain before failure. Since each succeeding outer reinforcing member is subjected to a relatively lower unit strain, the yield points for these members can be relatively higher than that of the next innermost member and these reinforcing members will still have the nonelastic deformation or plastic portions of their stress-strain curves similar to that of the innermost core member 5. Thus each succeeding outer member will actually reinforce the inner members and serve to distribute properly the applied load.

By reference to the graph shown in Fig. 5 it will be further noted that the area under the stress-strain curves is very great so that a vessel constructed in accordance with the present invention will absorb the greatest amount of energy used before failure.

From the foregoing it will be seen that the present invention permits a high pressure vessel to be fabricated which utilizes the full physical properties of the component members forming the vessel in a most efficient and practical manner.

I claim as my invention:

1. A high pressure vessel comprising a metal inner container adapted to contain a fluid under high pressure, and at least one metal reenforcing container enclosing the fluid container in a substantially nesting relation to provide a laminated structure for the vessel, the metal of said containers being related for assembly by their stress-strain characteristics so that when under load and before the metal of each successive container towards the outside reaches its plastic deformation point the metal of the next preceding inner container has exceeded its elastic range of deformation and entered its plastic range of deformation whereby the working load from the high internal fluid pressure is more effectively transmitted to the outer layer.

2. A high pressure vessel comprising a metal inner container adapted to contain a fluid under high pressure, and at least one metal reenforcing container enclosing the fluid container in a substantially nesting relation to provide a laminated structure for the vessel, the metal of said containers being related for assembly by their stress-strain characteristics so that when under load and before the metal of each successive container towards the outside reaches its plastic deformation point the metal of the next preceding inner container has exceeded its elastic range of deformation and entered its plastic range of deformation and so that the metal of each successive container towards the outside will reach its ultimate stress at least as soon as the metal of the next preceding inner container, whereby the working load from the high internal fluid pressure is more effectively transmitted to the outer layer.

3. A high pressure vessel comprising a metal inner container adapted to contain a fluid under high pressure, and at least one metal reenforcing container enclosing the fluid container in a substantially nesting relation to provide a laminated structure for the vessel, the metal of said containers being related for assembly by their stress-strain characteristics so that when under load and before the metal of each successive container towards the outside reaches its plastic deformation point the metal of the next preceding inner container has exceeded its elastic range of deformation and entered its plastic range of deformation and so that the plastic range of the metal of each successive container towards the outside provides a lesser yield per unit of stress increase than that for the next preceding inner container, whereby the working load from the high internal fluid pressure is more effectively transmitted to the outer layer.

SYLVESTER VET WILLIAMS.

References Cited in the file of this patent

UNITED STATES PATENTS

| Number | Name | Date |
|---|---|---|
| 40,498 | Patterson | Nov. 3, 1863 |
| 285,576 | Coas | Sept. 25, 1883 |
| 1,080,897 | Davies et al. | Dec. 9, 1913 |
| 1,350,666 | Murphy | Aug. 24, 1920 |
| 1,495,027 | Mader | May 20, 1924 |
| 1,634,754 | Methlin | July 5, 1927 |
| 1,696,725 | Murray | Dec. 25, 1928 |
| 1,925,118 | Stresau | Sept. 5, 1933 |
| 2,217,090 | Zerbe | Oct. 8, 1940 |
| 2,253,093 | Raichle et al. | Aug. 19, 1941 |
| 2,273,736 | Raymond et al. | Feb. 17, 1942 |
| 2,363,967 | Jasper | Nov. 28, 1944 |

FOREIGN PATENTS

| Number | Country | Date |
|---|---|---|
| 554,088 | Great Britain | June 18, 1943 |